United States Patent [19]

Brunnett et al.

[11] Patent Number: 4,975,843
[45] Date of Patent: Dec. 4, 1990

[54] PARALLEL ARRAY PROCESSOR WITH INTERCONNECTED FUNCTIONS FOR IMAGE PROCESSING

[75] Inventors: Carl J. Brunnett, Willoughby Hills; Beverly M. Gocal, Richmond Heights; Paul J. Hyland, Ravenna; Michael M. Kerber; James M. Pexa, both of Cleveland Heights; John Sidoti, Parma; Chris J. Vrettos, Mentor, all of Ohio

[73] Assignee: Picker International, Inc., Highland Heights, Ohio

[21] Appl. No.: 276,142

[22] Filed: Nov. 25, 1988

[51] Int. Cl.$^5$ .................. G06F 9/28; G06F 15/31
[52] U.S. Cl. ...................... 364/413.14; 364/200; 364/231.9; 364/931.01
[58] Field of Search ............ 364/413.14, 413.15, 364/231.9, 931.01, 931.03

[56] References Cited

U.S. PATENT DOCUMENTS

| | | | |
|---|---|---|---|
| 4,298,936 | 11/1981 | Shapiro | 364/200 |
| 4,310,879 | 1/1982 | Pandeya | 364/200 |
| 4,494,141 | 1/1985 | Altekruse | 364/413.15 X |
| 4,504,909 | 3/1985 | Acharya et al. | 364/413.15 |
| 4,745,544 | 5/1988 | Renner et al. | 364/200 |

OTHER PUBLICATIONS

"A Coprocessing System for Microcomputer-Based Signal, Image, Graphics, and Scientific Processing Systems", Computer Systems, Inc., May 1984.
"AP500 Series Floating Point Array Processors" of Analogic, Computing Systems Division, 1982.
"FPS-5000 Series Array Processors", Digital Equipment Corp., Jul. 1983.
"Design Entry-One -Chip FFT Sequencer", Electronic Design, Jul. 12, 1984, p. 166.
"Sky Warrior 15 MFLOP Array Processor", Sky Computers, date unknown.
"ST-100-The 100 Megaflop Array Processor", Star Technologies, Inc., 1982.

Primary Examiner—Clark A. Jablon
Attorney, Agent, or Firm—Fay, Sharpe, Beall, Fagan, Minnich & McKee

[57] ABSTRACT

An array processor has been designed in a highly paralleled fashion thereby allowing extremely fast movement of data. Two 32-bit words come out of an internal data memory device. This data is fed into a register file. On the same clock cycle, three 32-bit results are coming out of an arithmetic unit. Those results feed back into the register file. Therefore, on a single clock cycle, five separate pieces of data are going into the register file. In the same clock cycle, other data coming out of the outputs of the register file feed data into two separate floating arithmetic adders and one floating arithmetic multiplier. The design of the present embodiment allows a constant flow of data to be supplied to the arithmetic unit thereby using the arithmetic unit to its maximum functioning ability.

18 Claims, 6 Drawing Sheets

PARALLEL ARRAY PROCESSOR WITH INTERCONNECTED FUNCTIONS FOR IMAGE PROCESSING

BACKGROUND OF THE INVENTION

The present invention relates to digital processing. The present invention finds particular application in tomographic image reconstruction and will be described with particular reference thereto. However, it is to be appreciated that the invention is also applicable to other types of image and data processing.

In the field of computerized tomographic scanners, the accurate reconstruction of images is of utmost importance. One of the major drawbacks in accurate image reconstruction has been the amount of time necessary to complete the image reconstructions for each scan of a multi-scan procedure. The longer the time necessary to complete the image and initiate the next scan of the procedure, the more likely procedure degrading occurrences, such as patient movement, become.

Improving the speed of data acquisition or once data has been acquired, increasing the speed at which it is manipulated increases the speed of reconstruction of the scanned image. Central to the reconstruction of an image is a convolution process which prepares the data for backprojection into image. The speed of the convolution process is a constraint on the speed of the total system. Faster convolution achieves faster image reconstruction allowing for more accurate scans and less scans which must be re-performed.

In the past, array processor design used in CT scanning normally used a random access structure with single port, thereby allowing only a single memory location to be accessed in one clock cycle. This caused significant bottle necks in the transfer of data to the arithmetic unit. Additionally, array processors previously used contained significant amounts of unused clock cycles in transferring of data. Therefore, for the above two reasons, the arithmetic unit operated far below its possible theoretical maximum. This in turn significantly slowed down the entire image reconstruction process.

The present invention provides a convolution technique and circuit that improves convolution processing speed.

SUMMARY OF THE INVENTION

The general purpose of the present embodiment is to implement an array processor for use in a computerized tomographic scanner system where the scanner irradiates an examination region, detects the radiation and outputs the acquired to be processed so that an image is reconstructed.

The array processor uses a highly parallel design with interconnected functions. Specifically, an internal data memory means is used to accept the acquired data at addressed memory locations. An addressing means generates the addresses which indicate the locations where the data is stored and from which the data is outputted. A register file for accepting data values which are outputted from the internal memory. The memory locations of the data are chosen by the address generating means. Mathematical operations are performed on the data values outputted from the register file by an arithmetic means which is connected with the register file both for accepting the data originally and for returning modified data values to the file. Finally, a means for reconstructing data values received from the register file into an image representation is known.

A first advantage of the present invention is that it supplies enough data simultaneously on the same clock cycle to the arithmetic unit to support the full speed of the arithmetic unit.

Another advantage of the present invention is that on the same clock cycle which data being entered into the system data of completed operations is being outputted from the system.

Still further advantages of the present invention will be apparent to others upon reading and understanding the following detailed description.

BRIEF DESCRIPTION OF THE DRAWINGS

The present invention may take form in various parts and arrangements of parts or in various steps and arrangements of steps. The drawings are only for purposes of illustrating a preferred embodiment and are not to be construed as limiting the invention.

DETAILED DESCRIPTION OF THE PREFERRED EMBODIMENT

Figure 1:
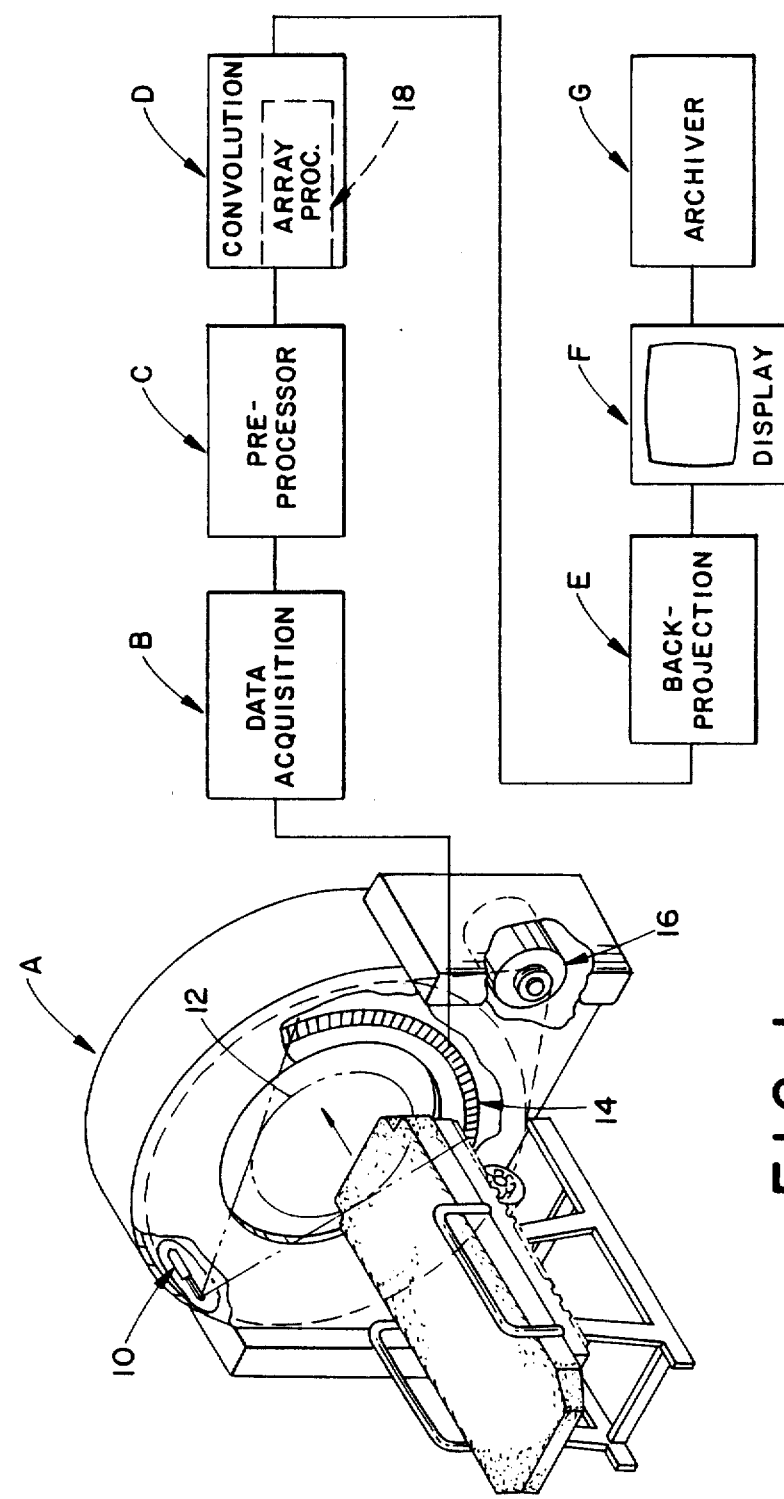
FIG. 1 is a diagrammatic illustration of a computed tomography imaging apparatus in accordance with the present invention.

With referenced to FIG. 1, a CT scanner gantry A includes an x-ray tube 10 which selectively projects a fan shaped beam of radiation across an image circle 12. The radiation impinges upon a radiation detection means, such as an array of detectors 14, which generate electronic data signals indicative of radiation absorptive or transmissive properties of a subject in the image circle. A rotating means 16 selectively causes relative rotational movement of the radiation beam around the scanned circle. A data acquisition means acquires the data generated by the detectors to generate a plurality of data sets or views.

In the preferred embodiment, each data set includes a data element for each detector which is currently irradiated and sampled. The data acquisition means samples an irradiated detector subset a plurality of times before the next subset or fraction of detectors becomes irradiated. The acquired data subsets are reordered into detector data sets and delivered to a pre-processing means C in which each data subset is normalized and spectrum and other corrections or adjustments are made. An image reconstruction means reconstructs an image representation of the radiation absorptive properties of the subject in the scan circle from the fan beam data subsets. The image reconstruction means includes a convolving means D which convolves sets of the data with a convolution or filter function. A backprojector E backprojects the convolved data sets into an image or display memory F for display on a video monitor or display means. The reconstructed electronic image representation is archived G on tape or disk to be saved for future use.

With continuing reference to FIG. 1, the convolving means D includes an array processor means 18. The array processing means 18 manipulates data received from the preprocessing means B to order process into to convolved views for the backprojecting means D.

Figure 2:
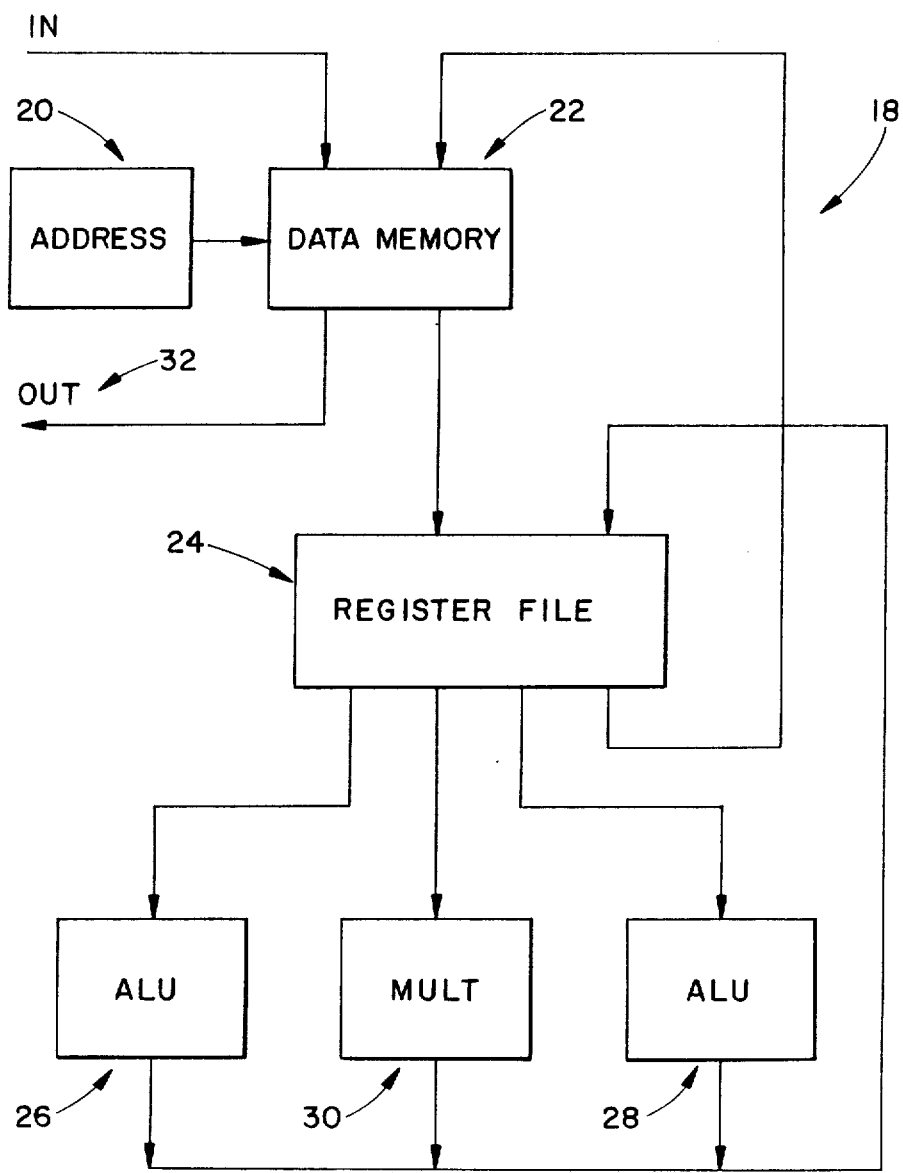
FIG. 2 is a simplified block diagrammatic illustration of the array processor of the convolver of FIG. 1.

Turning now to FIG. 2, which shows a simplified block diagram of the array processor 18. An address generator 20 cyclically generates selected addresses for a data memory means 22. The data memory means 22 receives and passes lines of data to a registration file 24 under the control of the address generator. The registration file 24 in turn passes on selected data to floating point adding units 26, 28 and a floating point multiplying unit 30. The units all perform arithmetic operations involving the least and most significant bits of the transferred data. It also recirculates a selected part of the data line back to the data memory means 22. Each line of data received in the data memory 22 is repeatedly operated on with a convolution function which modifies each data element in accordance with neighboring and other data elements within the line. After the data line is convolved, the address generator passes it to output 32 and the next data line is received in the data memory.

Figure 3:
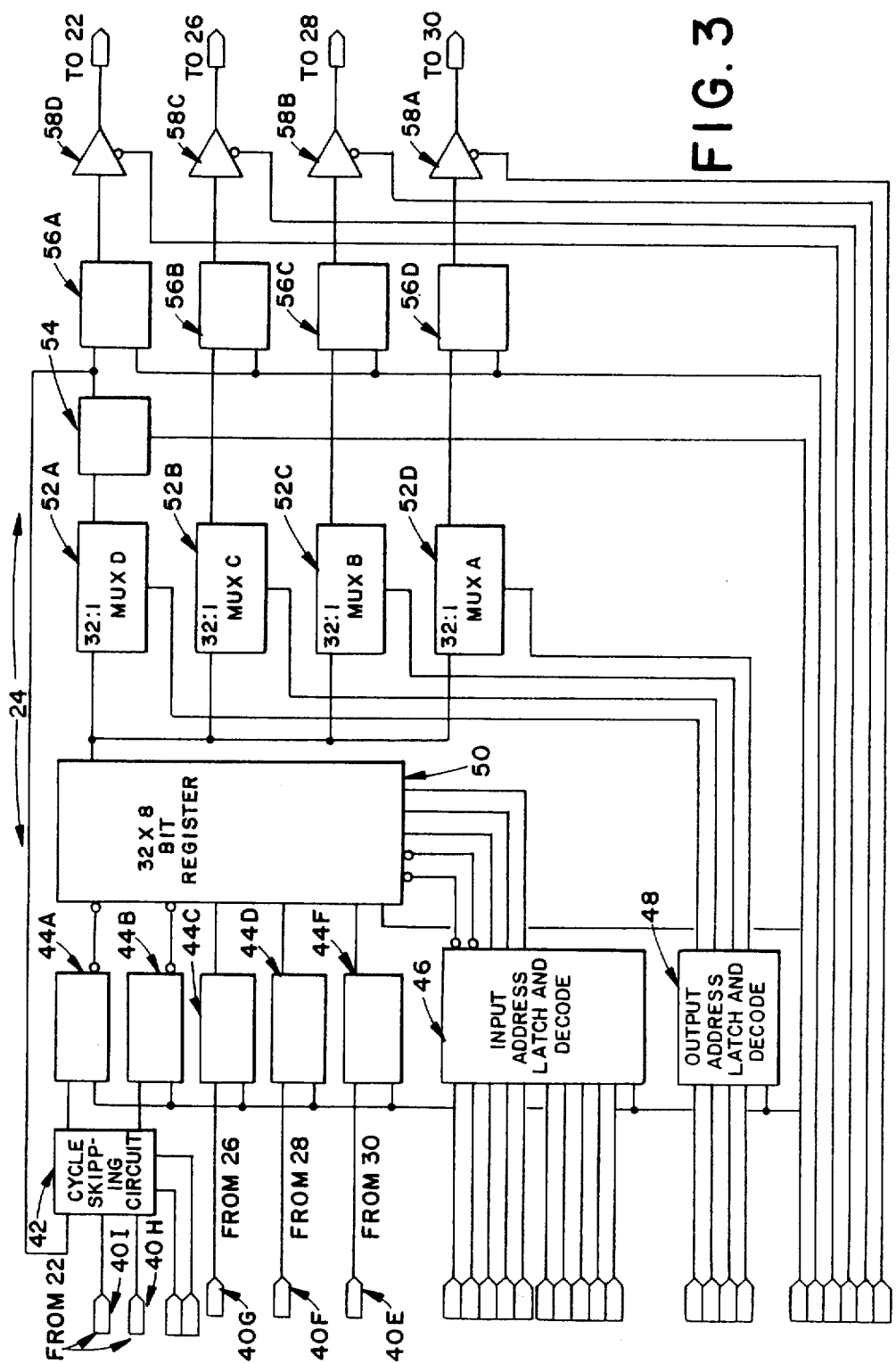
FIG. 3 is an expanded view of a single register file bank.

With reference to FIG. 3, data is received in the register file from a plurality of output sources, preferably, five input sources: 40E-40I. In the preferred embodiment, two input ports 40H and 40I accept data from data memory 22. The other three input ports 40E-40G receive data from the floating adders 26 and 28 and the floating point multiplier 30.

Data is moved in a pipeline manner such that at least four data operations can be performed at a time. Specifically, at the leading edge of a first clock pulse, data received in a plurality of latches, specifically, in latches 44A-44E are clocked into chosen address locations of a 32×8 bit register 50. In the same first clock pulse, data from other chosen locations of the 32×8 bit register 50 is clocked out to a plurality of multiplexers, specifically to 32:1 multiplexers 52A-52D. Multiplexed data from multiplexers 52A-52D are clocked with the leading edge of the same clock pulse to a second plurality of latches, specifically, latches 56A-56D. The data at the outputs Q of the latches 56A-56D are transferred to outputs 58A-58D on the leading edge of the same clock pulse.

The address generator generates the addresses in a pattern in which the data is never read into and out of the same memory cell of the 32×8 bit register in the same clock cycle.

Cycle skipping circuit 42 is activated when additional data is received by the data memory 22. Specifically, when data is to be read externally from the data memory, data is saved at a data holding register which exists at the H input of the register file 50. This register saves the data present at the port during a cycle skip sequence. The data resulted from a read operation from data memory 22 during a cycle skip operation. The cycle skip operation stops the movement of data from continuing in its normal pipeline type manner immediately following the cycle skip operation and on the first clock cycle that data is clocked into the H input of the register file 50, thus preserving it.

A swapping circuit 54 interchanges the 16 lower bits of data and 16 most significant bits of data in the preferred embodiment. This facilitates the packing and unpacking of 16 bit integer data, thereby increasing processing speeds by avoiding the necessity of such manipulation in the adder and multiplier units.

Figure 4:
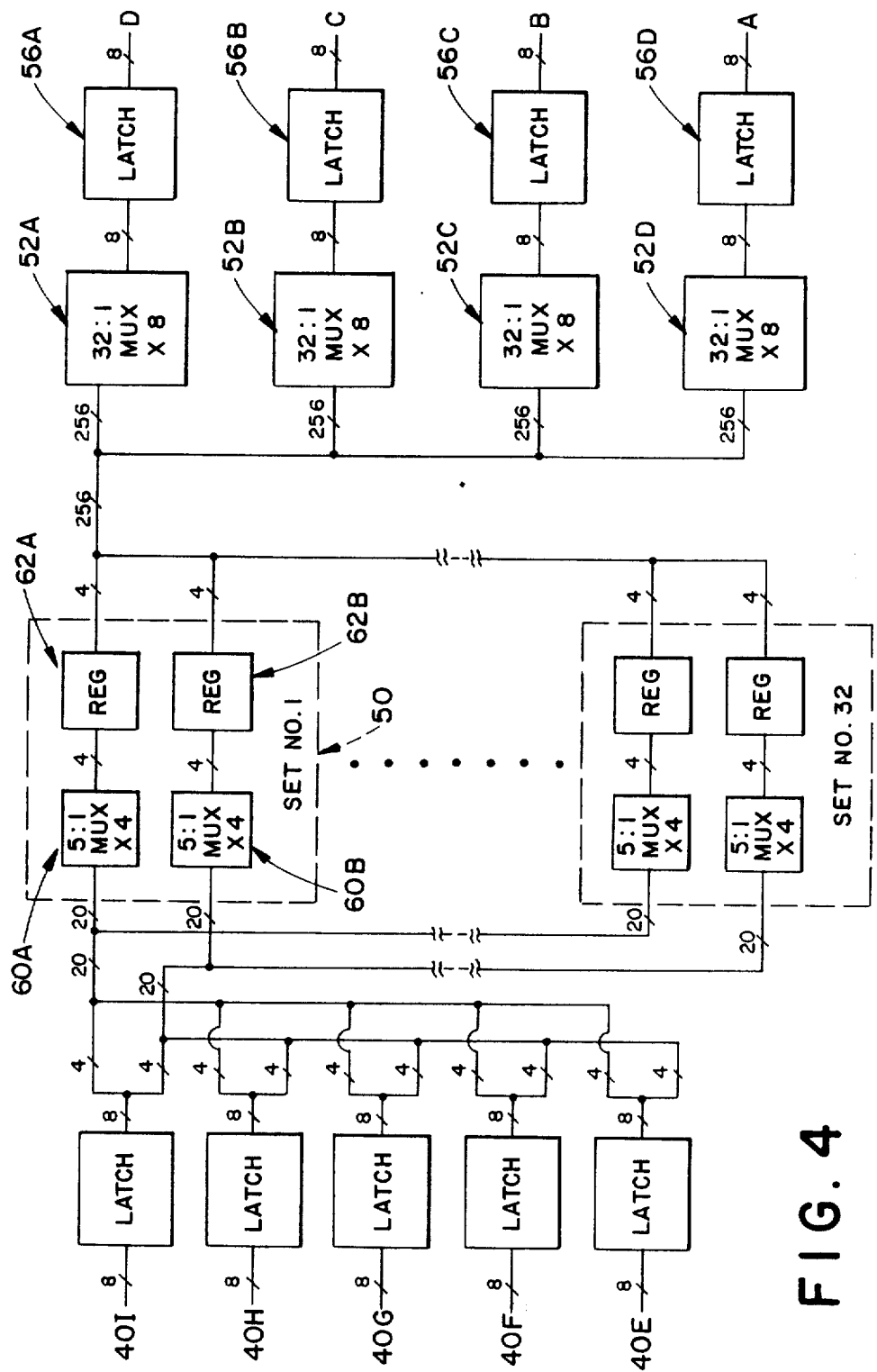
FIG. 4 is a block diagram expanding in detail on the input to the register bank of FIG. 3; and, FIG. 5A and 5B are an expanded diagrammatic illustration of the present array processor of FIG. 2.

With reference to FIG. 4, the register 50 includes a plurality of smaller subregister means 62. In the 32×8 bit preferred embodiment, it can be divided into 32 1×8 bit subregister means 62. Of course, the depth of each register means 62 is selected in accordance with the size of the data to be received. If n bit data is to be received, then each subregister means 62 would be 1×n bits.

The 32×8 bit register 50 also includes a switching means for selectively interconnecting each subregister means 62 with one of the inputs 40E-40I. In the preferred embodiment, an 8 or n bit multiplexer means is connected with each subregister. In the illustrated five input embodiment, each multiplexer means is a 5:1 multiplexer. However, for m inputs, an m:1 multiplexer would be selected.

Each multiplexer means is connected with all of the inputs. For five inputs which receive 8 bit data, each multiplexer means 60 receives 40 inputs and has 8 outputs, one to each of the memory cells of its corresponding subregister. Each of the multiplexing means 60 is addressed to cause data from the corresponding one of the inputs to be channeled to its corresponding subregister 62.

For still greater speed, the data is processed in four bit packets. To this end, each multiplexing means 60 includes two four bit multiplexers 60A and 60B. Analogously, each of the 1×n subregisters is divided into n/4 four bit subregisters, i.e. two four bit subregisters in the illustrated 8 bit embodiment. Analogously, 16 bit data could be divided among two 8 bit multiplexers and two 8 bit subregisters or among four 4 bit multiplexers and four 4 bit subregisters.

Analogously, the four 32:1 eight bit multiplexers 52A-52B are controlled to read data only from selected ones of subregisters 62. Again, the multiplexing means 60 and the multiplexing means 52 are controlled in coordination such that the multiplexers 60 are never trying to write into the same subregister as multiplexers 52 are trying to read out of.

Figure 5A:
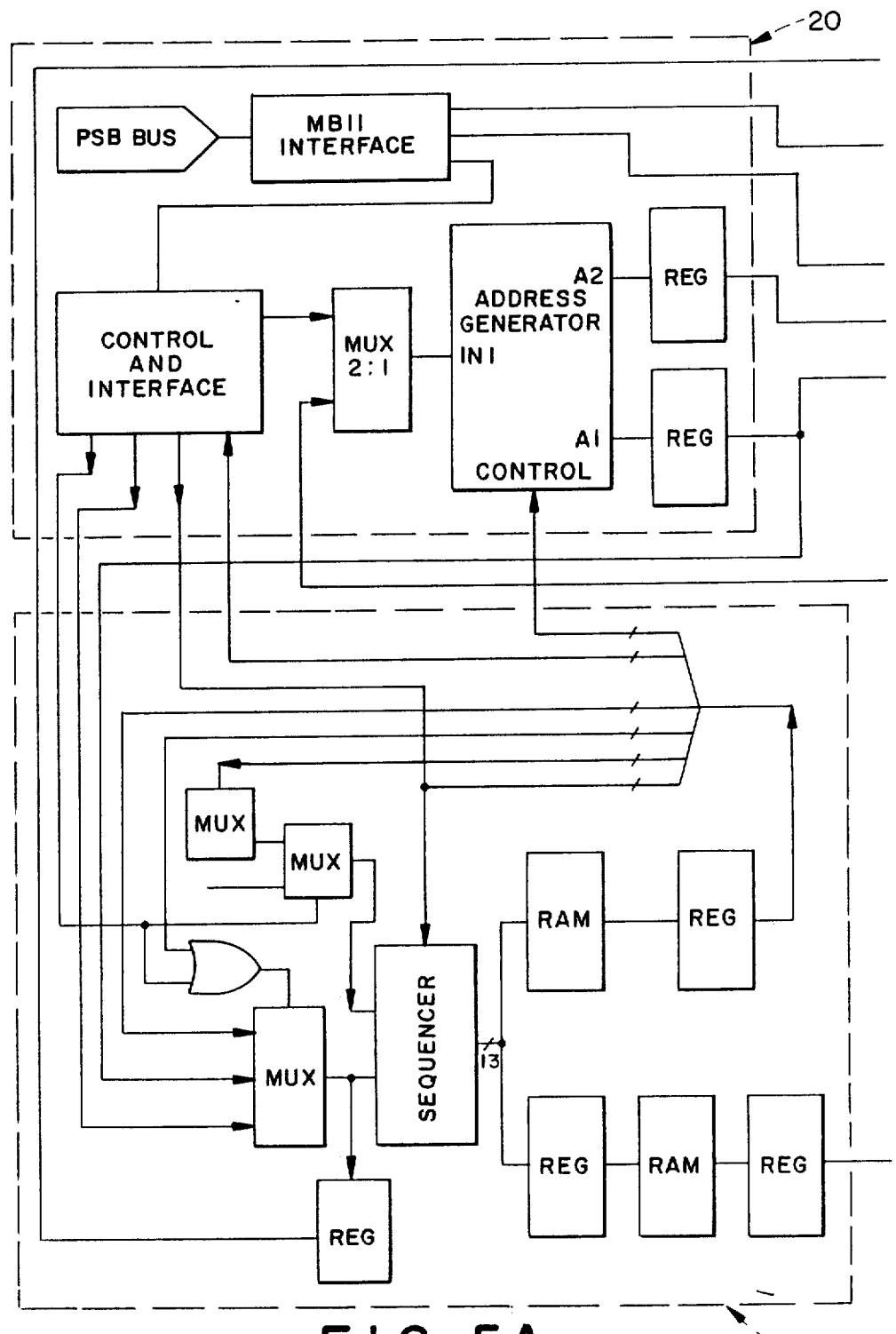
Figure 5B:
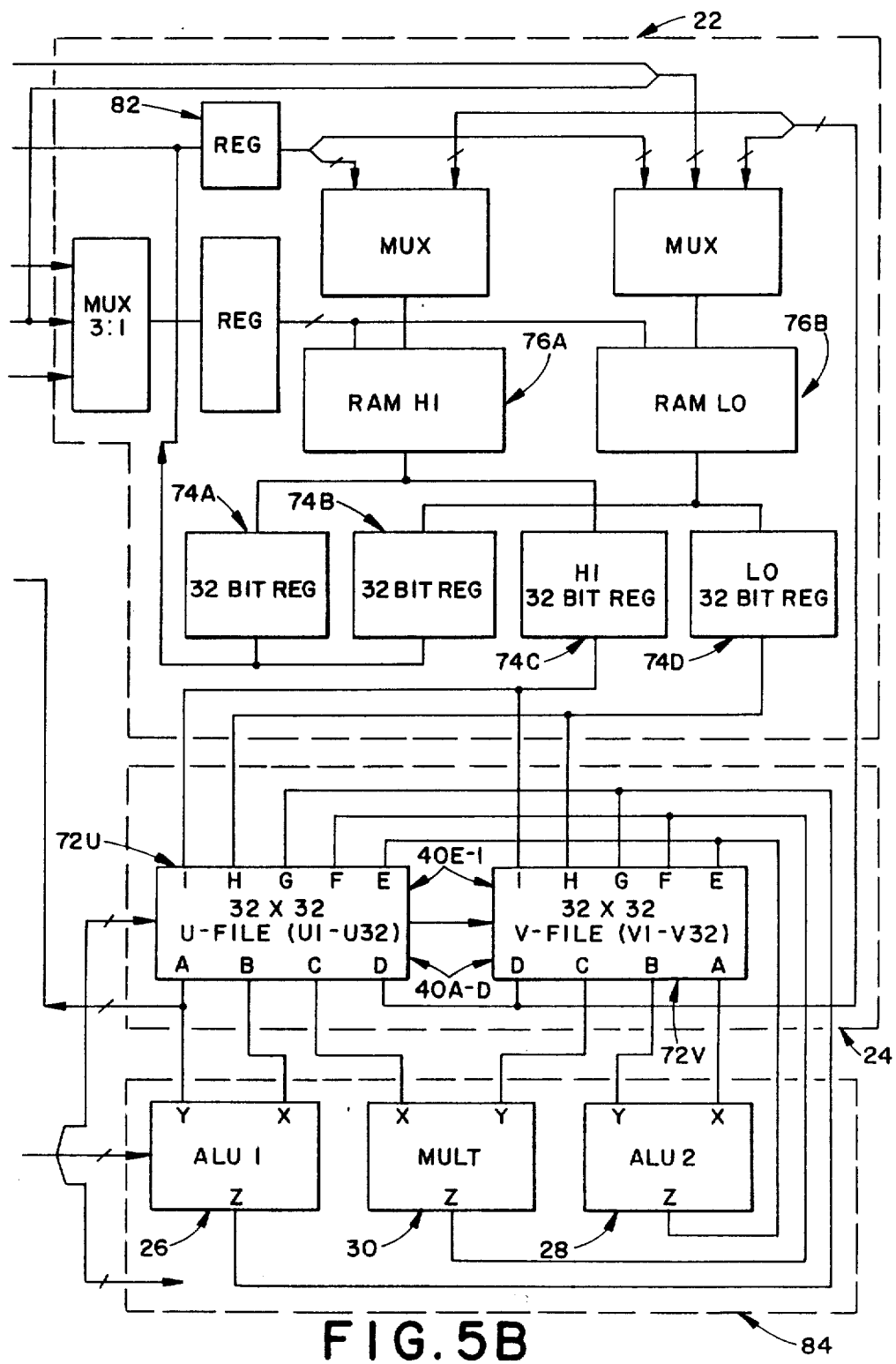

Turning now to FIG. 5, an internal address generator 20 for the generating of address locations of the data memory 22 consists of two integer ALUs, a combination bit reverser-barrel shifter and sixteen 16-bit registers (not shown). Since the address generator 20 runs on a 100 nanosecond clock, the address generator 20 operations are initiated on even-numbered cycles. Each integer ALU can perform logical and binary arithmetic operations. The two ALUs in the address generator allow two ALU operations to be performed during an even-numbered cycle. The bit reverser-barrel shifter allows bit reversing and/or barrel shifting operations on the address generator registers during the same cycle as ALU operations.

The shift operation rotates the specified data the given number of places to the left. The high order bits that are shifted out get moved to the low order bits. A bit reverse and a barrel shift operation can be performed on the register file at the same time. The data in the register will be shifted first and then bit-reversed. Due to the existence of the two ALU's, two output addresses are generated within one cycle. Since the address generator 20 runs on a 100 nanosecond clock, these addresses are generated on even-numbered cycles.

A multiported register file 24 consists of two banks 72U and 72V of thirty-two 32-bit registers registers U1-U32 and V1-V32. Inputs to the register file 24 come from five sources. Two input ports come from RAM output registers 74B and 74D which receive 32-bit words from data memories 76A-B during a single cycle. The high order portion of the 32-bit words from the RAM output registers 74C is connected to an I port of each bank 72U, 72V and a low order portion RAM output register 74D is connected to the H port of each bank 72U, 72V. The H and I port addresses are shared by each bank, but there are separate write enable control bits for each path. Thus, the data in the RAM output registers 74C and 74D can both got to two registers of the same bank (e.g. V1 and V6; where e.g. V1 means bank 72V in the first of 32 register positions; it should be noted that these are simply examples and are not meant in any way to be limiting), or to one different register in each of banks 72U and 72V (e.g., U2 and V7). The data from the RAM output register 74C or 74D also goes to the same register in each bank (e.g., U8 and V8).

The other three input ports E-G of the register file come from the output of the floating point adders 26, 28 and from the output of the floating point multiplier 30. The two register banks 72U and 72V share these 3 input port addresses. Thus, the data from the floating point arithmetic and multiplier units can go to two registers in the same bank (e.g. V1 and V6), or to the same register in each bank (e.g., U2 and V2), but not to different registers in each bank.

Three of the four output ports A-D of each bank of the register file 24 are addressed separately. Two output ports (ports B and A) of the 72U bank are connected to the X and Y inputs of the floating point adder 26. Two output ports (ports A and B) of the 72V bank are connected to the X and Y inputs of the floating point adder 28. The third output port (port C) of the 72U bank is connected to the X-input of the floating point multiplier 30 and the third output port (port C) of the 72V bank is connected to the Y-input of the floating point multiplier 30.

The present embodiment has the additional capacity of performing a register to register transfer of data from one of the 32 register locations to a different register location within the 32 register locations. Specifically, the D output port internally transfers data from its port into the I input port, thereby allowing the contents of a selected register location of the register file 50 to be transferred to a second selected register location without the necessity of recirculating the data externally through the data memory 22, the floating point adders 26, 28 or the floating point multiplier 30.

The output port (port D) of the register file 24, which is connected to the input of data memory 26, contains a 16-bit swap device (not shown). Data presented at this port can have its low order 16 bits swapped with the high order 16 bits. The 16-bit swap capability is used for integer packing and unpacking operations and for selecting the desired 16 bits to be transferred to the address generator 20.

The internal data memory 22 is 64 k by 64 bits. Addressing is performed on 64-bit boundaries and 64 bits is read or written every 50 nanoseconds with a 100 nanosecond clock cycle. Two consecutive 32-bit data words are read from data memory or written into data memory during one clock cycle. A data memory read transfers data from data memory 22 into the registers of register file 24 via the RAM output registers 74A-74D. The two 32-bit words read from data memory 22 are stored in two registers of the same register file bank, or in the same register address of both register file banks. One or both data memory words is transferred to the register file 24. Only one data memory read is initiated within a single statement, but two consecutive 32-bit words of data is fetched. Both the transfer operations, high and low, from the RAM output registers can be performed in a single statement. As stated previously, the data in the RAM output registers both go to different registers in the same register bank (e.g. V2 and V6), to different registers in different banks (e.g., U2 and U7), or the same register in different banks (e.g., U8 and V8).

Data can be written from the register file 24 into the data memory 22 via port D and the RAM input register 82. Once the data is in the RAM input register, it is passed into data memory (at the address specified) on the next cycle. If two words of data are to be written into data memory on one cycle, the high order word comes from a 72U bank register, the low order word comes from a 72V bank register, and the addresses of each register are the same (e.g., U3 and V3). If only one word of data is to be written into data memory, data that is to be written into the high 32-bits of RAM at the specified address comes from the 72U bank and data that is to be written into the low 32-bits of RAM at the specified address comes from the 72V bank.

A floating point unit 84 includes the two floating point arithmetic logic devices 26, 28 and the floating point multiplying device 30. Each floating point arithmetic logic device 26, 28 also performs 32-bit integer operations. The X and Y inputs of floating point adder 26 are ported separately to the output of the 72U bank of the register file. The X and Y inputs of floating point adder 28 are ported separately to the output of the 72V bank of the register file. The X-input of the multiplier 30 is ported to the output of the 72U bank of the register file 24 and the Y input of the multiplier 30 is ported to the output of the V bank of the register file. The output of each floating point device is ported to the input of both banks of the register file, thereby allowing data to be recirculated to the register file. Each floating point device contains holding registers (not shown). There are two 32-bit holding registers for floating point values per device.

Data presented on either of the X input or Y input lines of each device may be written into either of the holding registers, or may be passed directly into either of two register inputs of the arithmetic unit. Data passed into the arithmetic unit 84 overwrite data already in the device's holding registers. Once the floating point or integer operation is initiated, a latency of four cycles exists before the result is available in the output register.

Results from the floating point operations, or the integer adder operations, is loaded into the register file banks 72U, 72V. The output of each floating point device can be transferred to either (or both) register file bank. The floating point adder devices have an added feature in that once the resulting data is available, it can be fed back into the input of the arithmetic unit in addition to being loaded into the register file. The internal feedback capability allows on-chip accumulation and thereby shortens the latency of successive floating point adder operations.

The sequencing of events occurring in the array processor 18 is controlled by a board controller section 90. The board controller section is programmed with a microcode system to implement the above discussed operations.

Once sufficient operations have been preformed upon the accumulated data, such data is again entered in the data memory 22 (FIG. 2) and is then passed onto the backprojection section of image reconstruction.

The invention has been described with reference to the preferred embodiment. Obviously, modifications and alterations will occur to others upon reading and understanding the preceding detailed description. It is intended that the invention be construed as including all such alterations and modifications insofar as they come within the scope of the appended claims or the equivalents thereof.

Having thus described the preferred embodiment, the invention is now claimed to be:

1. A computerized tomographic scanner comprising:
   a source of penetrating radiation for irradiating an examination region;
   a detector array for receiving radiation that has traversed the examination region and producing output signals indicative thereof;
   a data acquisition and processing means for receiving the detector output signals and producing n-bit data values therefrom;
   an array processor for processing the data values, the array processor including:
      an internal data memory means which accepts and stores the data values at addressed memory locations and outputs the data values from addressed memory locations;
      an address generating means for generating addresses for the internal data memory means, the data addresses indicating the memory locations in which the data values are stored and from which the data values are outputted;
      a register file for accepting the data values outputted from the internal data memory means memory location, the memory locations being chosen by the address generating means;
      an arithmetic means for performing mathematical operations on the data values outputted from the register file, the arithmetic means being operatively connected with the register file and returning modified data values thereto; and,
   a means for reconstructing the data values received from the register file into an image representation.

2. The scanner as set forth in claim 1 wherein the arithmetic means includes floating point adding and multiplying units.

3. The scanner as set forth in claim further including a clocking means for clocking the data values among the internal data memory means, the register file, and the arithmetic means on a common clocking pulse.

4. The scanner as set forth in claim 1 wherein the register file includes at least two registers, each register having output ports which are interconnected with input ports of the arithmetic means and the internal data memory means and having a plurality of input ports which are interconnected with outputs of the arithmetic means and the internal data memory means.

5. The scanner as set forth in claim 4 wherein the internal data memory means includes a word memory means for receiving words of data values from the data acquisition means and at least two register means, one register means for receiving the most significant bits of each word and the other register means for receiving the least significant bits of each word, the register means each being connected to different inputs of the register files.

6. An array processor with a highly paralleled architecture, the processing comprising:
   an internal data memory means which accepts and stores data values at addressed memory locations and outputs data values from addressed memory locations;
   an address generating means for generating addresses for the internal data memory means, the data addresses indicating the memory locations in which the data values are stored and from which the data values outputted;
   a register file for accepting data values outputted from the internal memory means memory locations addressed by the address generating means; and,
   an arithmetic means for performing mathematical operations on the data values outputted from the register file, the arithmetic means being operatively connected with the register file for returning modified data values thereto.

7. The processor as set forth in claim 6 wherein the arithmetic means includes floating point adding and multiplying units.

8. The processor as set forth in claim 6 further including a clocking means for clocking the data values among the internal data memory means, the register file, and the arithmetic means on a common clocking pulse.

9. The processor as set forth in claim 6 wherein the register file includes at least two registers, each register having a plurality of output ports which are interconnected with input ports of the arithmetic means and the internal data memory means and having a plurality of input ports which are interconnected with outputs of the arithmetic means and the internal data memory means.

10. The processor as set forth in claim 9 wherein the internal data memory means includes a word memory means for receiving words of data values from a data acquisition means and at least two register means, one register means for receiving the most significant bits of each word and the other register means for receiving the least significant bits of each word, the register means each being connected to different inputs of the register files.

11. A method of reconstructing an image representation from radiation intensity signals of a CT scanner, the method comprising:
   organizing the x-ray intensity data into lines of digital data values;
   receiving and storing a line of data values in an internal data memory means;
   transferring portions of each data line into a register file memory means;
   performing arithmetical operations on the data values from the register file memory means with an arithmetic means;
   clocking a first portion of the data values of the data line in the register file memory means back to the internal data memory means and operating on the data values of another portion of the data line with arithmetic operations;
   recycling arithmetically processed data values to the register file memory means;
   backprojecting data values from the internal data memory means into an image representation.

12. The method as set forth in claim 11 wherein in the recycling step data values are recycled between the register file memory means and the arithmetic means a plurality of times before the mathematically processed data values are transferred to the internal data memory means and backprojected.

13. The method as set forth in claim further including generating address locations for data values transferred to the register file memory means and for data values transferred from the register file memory means to the arithmetic means.

14. The method as set forth in claim 11 wherein the clocking step includes clocking data values from the internal memory means to the register file memory means, from the register file memory means to the arithmetic means and to the internal memory data memory, and from the arithmetic means to the register file means on a common clock pulse.

15. The method as set forth in claim 11 wherein the step of transferring data from the internal data memory means to the register file means includes transferring most significant bits of each word to one register memory means and transferring least significant bits to another register means and selectively transferring the least and most significant bits to the register file means.

16. The method as set forth in claim 15 wherein the register file means includes at least two registers and further including transferring the most significant bits and the least significant bits to the other.

17. The method as set forth in claim 16 wherein the arithmetic operation steps includes:

performing separate arithmetic operations on the least and most significant bits.

18. The method as set forth in claim 17 further including generating address locations for data values transferred to the register file memory means and for data values transferred from the register file memory means to the arithmetic means.

* * * * *